United States Patent [19]

Offenhausen et al.

[11] 4,402,890

[45] Sep. 6, 1983

[54] METHOD OF MANUFACTURING CEMENT BONDED BOARDS

[75] Inventors: Rainer Offenhausen; Hans G. Schwarz, both of Springe, Fed. Rep. of Germany

[73] Assignee: Bison-Werke Bahre & Greten GmbH & Co. KG, Fed. Rep. of Germany

[21] Appl. No.: 330,523

[22] Filed: Dec. 14, 1981

[30] Foreign Application Priority Data

Dec. 22, 1980 [DE] Fed. Rep. of Germany ....... 3048412

[51] Int. Cl.[3] ............................................ B29M 19/00

[52] U.S. Cl. ...................................... 264/37; 264/113; 264/118

[58] Field of Search .......................... 264/37, 118, 113

[56] References Cited

U.S. PATENT DOCUMENTS 2,989,774 6/1961 Erickson et al. ...................... 264/37
3,188,367 6/1965 Gottschalk ........................... 264/37

*Primary Examiner*—James R. Hall
*Attorney, Agent, or Firm*—Townsend and Townsend

[57] ABSTRACT

Cement bonded boards are manufactured by mixing wooden chip material with cement, additives and water and forming this mixture into a mat from which individual sections corresponding to the desired length of the board blanks are then produced. The individual sections are pressed and then hardened by the application of heat which produces initial setting of the cement. The boards are then left for a period of time so that the cement bond can reach its full strength. After this stage the boards are passed through a conditioning channel to achieve a moisture balance between the atmosphere and the board material. Only at this stage are the boards subjected to an edge preparation process in which they are trimmed to the final size. The waste material is at least partly comminuted and return to the beginning of the process where it is once again added to the chip material prior to the mat forming step.

11 Claims, 1 Drawing Figure

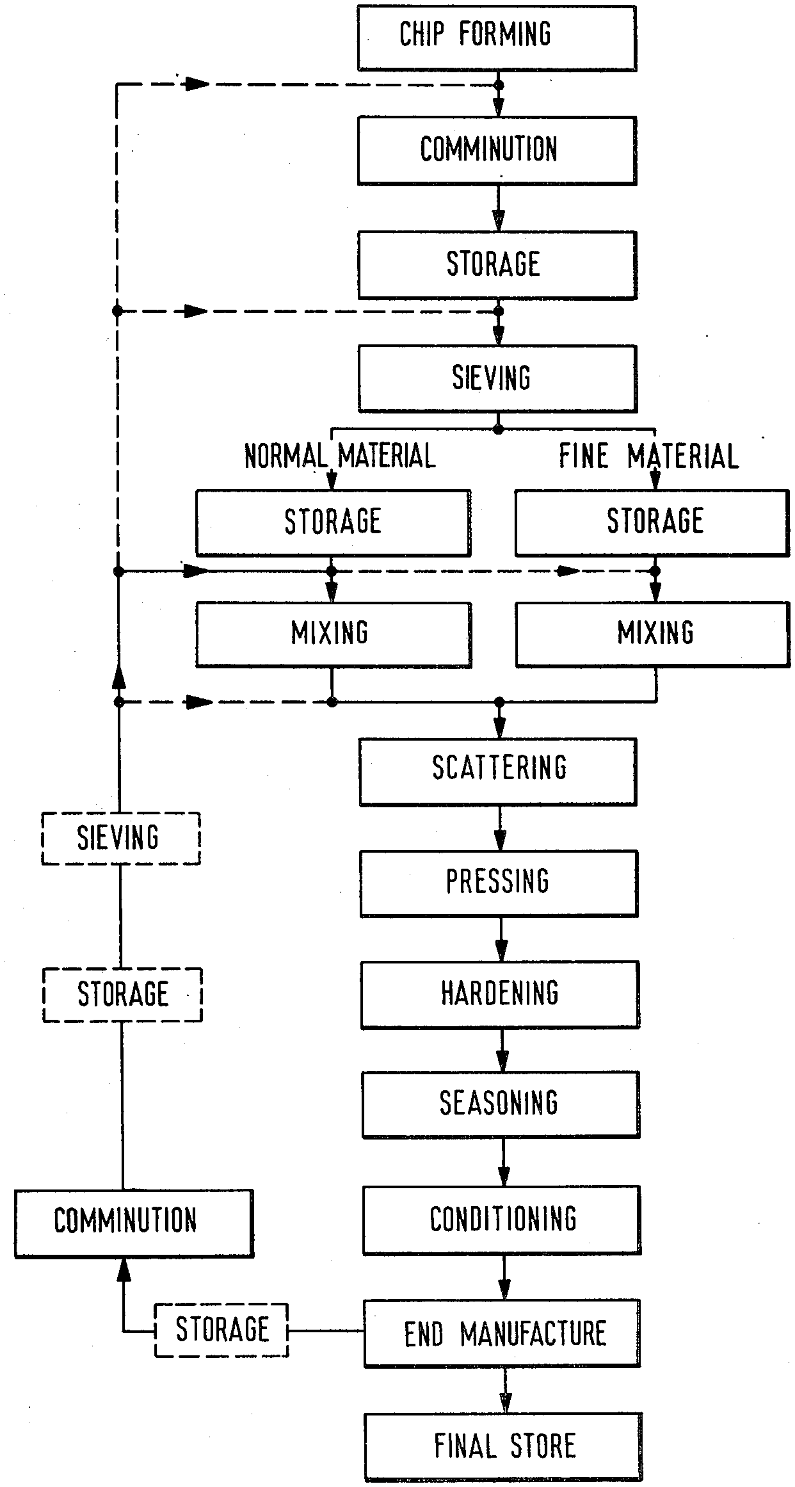
CHIP FORMING
COMMINUTION
STORAGE
SIEVING
NORMAL MATERIAL
FINE MATERIAL
STORAGE
STORAGE
MIXING
MIXING
SCATTERING
PRESSING
HARDENING
SEASONING
CONDITIONING
END MANUFACTURE
FINAL STORE
SIEVING
STORAGE
COMMINUTION
STORAGE

METHOD OF MANUFACTURING CEMENT BONDED BOARDS

BACKGROUND OF THE INVENTION

1. Field of the Invention

The invention relates to a method of manufacturing cement bonded boards wherein a mixture of chip material, cement, additives and water is formed into a mat from which individual sections corresponding to the desired length of the board blanks are then produced, with the individual sections being pressed and subjected to hardening and seasoning processes, whereupon the boards are passed through a conditioning channel to achieve a moisture balance between the atmosphere and the board material and are subsequently subjected to at least an edge preparation process.

Cement bonded wooden boards enjoy a wide spectrum of use, above all in the construction industry, because these boards are relatively light, can be easily machined with normal tools, are resistant to rot, fungus attack and moisture and behave as a practically noncombustible material. Cement bonded wooden boards can be used in many cases without the surfaces requiring special finishing treatments. It is also not necessary to provide any special protection of the edges against moisture.

2. Prior Art

In order to economically manufacture cement bonded wooden boards of this kind, attempts have already been made in the known manufacturing methods to produce as little waste as possible. Waste material however necessarily occurs during manufacture because the pressed boards must be trimmed to size in order to ensure the required nominal sizes and exact edges.

In order to be able to make use of even the cement components of the waste material which arises it is already known to carry out an initial trimming operation on the pressed boards after they have been hardened, to form the trimmings into chips and to re-use the fine material fraction. This initial trimming step is accordingly carried out at the earliest possible time and the reason for this is that one would like to obtain fine waste material which can still be reactivated and which can be returned to the manufacturing cycle.

The material which is obtained at the end of the manufacturing process during the required edge preparation, and also during an eventual grinding stage, is not capable of being reactivated and thus has been a non-exploitable waste material which was not employed further within the context of the manufacturing process.

The problem underlying the present invention is to produce a significant improvement in the economics of the manufacture of cement bonded wooden boards and to improve the quality and dimensional stability of the finsished boards while simultaneously simplifying the overall process.

SUMMARY OF THE INVENTION

This problem is solved by the invention, starting from the initially defined process for the manufacture of cement bonded wooden boards, in that the trimming to size of the boards is combined with the edge preparation process and that the resulting waste material is at least partly comminuted and substantially all added to the chip material prior to the mat forming step.

The basic idea underlying the invention is thus to omit the pretrimming stage which was previously considered necessary and to return the material arising in a working step at the end of the board manufacturing process, during trimming to size or edge preparation, to the manufacturing cycle as a kind of filler material even though this material is, in large part, no longer capable of being reactivated. Surprisingly, however, the board quality remains unchanged at a high level. This may largely be a consequence of the fact that the comminuted hardened material is encased by fresh material and is then once again fully integrated.

By avoiding an initial trimming stage not only is the manufacturing process significantly simplified, but the danger of damaging the edges of the board during handling in the area of the seasoning store and during conditioning is largely precluded because the existing marginal regions protect the edges of the individual boards right up to the end of the manufacturing process. Moreover, any eventual shrinkage of the board, which can occur right up to the end of the manufacturing process, does not result in inaccuracies or deviations of the finished boards from the predetermined sizes because the accurate cutting to size of the boards is only carried out at the end of the manufacturing process; i.e. after the boards have passed through the seasoning store and the conditioning chamber. Comminuted waste material which has a sufficient degree of fineness is preferably added to the covering layer material. It is however also possible to subdivide the comminuted waste material into coarse and fine material and to pass the fine material to the covering layer material, and the coarse material to the intermediate layer material, in each case in proportioned quantities.

It is also particularly expedient to subject at least a part of the comminuted waste material which does not have sufficient fineness for the covering layer material to a re-comminution process and then to add this material at least in part to the covering layer material. The addition of sufficiently comminuted waste material to the covering layer material has, on the one hand, no negative effects on the strength of the finished boards, yet on the other hand, produces a particularly dense and accordingly desirable structure of the covering layer.

If, for any particular application, the finished boards are ground on one or both sides then the grinding dust is also re-used, preferably in the context of the recycling of waste material, and is preferably added to the fine material intended for the covering layer.

The comminuted waste material can in principle be added at any desired point of the manufacturing cycle before the forming of the mat. It is however particularly advantageous to pass the comminuted waste material, which if necessary can be temporarily stored in a bunker, in proportioned quantities directly to the mixing stage because the desired coating of the waste particles with fresh cement starts at once in the mixer so that these waste materials are integrated in a particularly permanent manner into the product, even though the cement fraction is no longer capable of being reactivated.

Further advantageous forms of the method of the invention are set forth in the subclaims.

The invention can be used both in plants of low output, in which a mat is formed which is uniform throughout, and in plants of relatively larger output in which mats of differentiated structure having an intermediate layer and covering layers are generally to be found.

DETAILED DESCRIPTION OF THE PREFERRED EMBODIMENT

The invention will now be described in more detail in the following with reference to the drawing, the single FIGURE of which is in the form of a flow diagram which shows the sequential working stages during the manufacture of cement bonded wooden boards, and indeed in the case of a plant with relatively large output.

As shown in the flow diagram the wooden material is initially subjected to a chip forming and comminuting process to produce a mixture of chip material which is then temporarily stored in a bunker. The separation of the chip material into material for the intermediate and covering layers is carried out in a sieving machine, so that the normal material intended for the intermediate layer and the fine material intended for the covering layers can be introduced into separate bunkers. In the subsequent mixing stages the basic materials wood and cement are mixed with further additives and also with water. The mixing of the materials for the covering layer and for the intermediate layer takes place, at least in larger plants, in separate proportioning and mixing units. The separation into material for the covering and intermediate layers does not have to take place for smaller plants.

The subsequent formation of the mat can, in principle, take place in accordance with any known method as desired. In a plant operating in accordance with the flow diagram the material which is available is scattered with great accuracy in the form of covering layer and intermediate layer material so that an endless scattered mat is obtained the subdivision of which into lengths of board blanks can take place using a separating device running synchronously with the forming conveyor. Following forming, the board blanks are stacked together in packs in clamping frames. The board pack is then compressed in a press to the clamped size and held compressed in the clamping frame by means of a cover. In order to allow the setting process to take place under controlled conditions the board packs clamped in the clamping frames are prehardened in a hardening channel by the application of heat until, after a predetermined time, the boards can be removed from the stack.

After the boards have been unstacked and separated from the transport pallets that are provided they pass into a seasoning store. In this seasoning store the boards are left to season or ripen until they have reached their final strength. After this period the technological properties of the board are fixed.

Before the boards are delivered their moisture content is adjusted so that a moisture balance exists between the atmosphere and the board material. This measure is necessary to ensure a good stability of the board shape. For this purpose each board is guided through a conditioning channel.

It is of particular significance, in the context of the indicated manufacturing cycle, that the individual boards remain untrimmed until they have left the conditioning channel. As a result the external margins of the board blanks form protective frames for the individual boards during the handling stages. At the same time, this arrangement overcomes the previously disturbing shrinkage problem which occurred with the individual trimmed boards during conditioning and thus ensures a significantly improved dimensional stability of the finished boards.

All the boards are subjected to final finishing in the form of trimming to size by sawing or other suitable methods and, if required, the grinding of one or both sides, only after leaving the conditioning channel. If specific edge preparations are required these are likewise carried out in the final manufacturing stage and, if necessary, combined directly with the trimming step.

In addition, it is of important significance within the context of the invention that all the waste material which occurs during final manufacture can be returned to the manufacturing process after commminution, and, if necessary, after recomminution, and re-used so that practically no waste material is produced which needs to be removed.

The waste material can be stored in bunkers either before or after the comminution stage so that, on the one hand, the comminution devices only need to be operated when sufficient waste material is available and, on the other hand, it can be ensured that waste material can always be added to the fresh material in proportioned quantities during the manufacturing process. The aforementioned bunkers thus have a practical buffer function.

Comminuted waste material which has a sufficient degree of fineness can be returned either directly to the mixer for the covering layer material or, after previous separation into coarse material and fine material, both degrees of waste can be returned to the mixers for the intermediate layer material and for the covering layer material respectively.

As indicated by broken lines in the flow diagram, the comminution stage required for the fresh material can, if required, also be used to comminute the waste material in the required manner. The supply of waste material to this comminution stage always takes place in proportioned quantities.

It is also possible, in similar manner, to supply the comminuted waste material prior to the conventional sieving stage so that, in this case, the division into normal material and fine material takes place in the same manner as in connection with the fresh material.

It will be appreciated by those skilled in the art that the individual stages can be carried out using equipment which is already known per se. It will be appreciated for example that the hardening channel, in which setting of the cement is promoted by the application of heat, can conveniently take the form of a heated tunnel. The purpose of the subsequent "seasoning" is to allow the cement to develop its full strength. This process takes a significant amount of time, at least several hours, and so accordingly one requires either a store or a long transport tunnel so that the continuously moving boards have adequate time to cure fully.

Details have been disclosed to illustrate the invention in a preferred embodiment of which adaptations and modifications within the scope of the invention will occur to those skilled in the art. Therefore is is not intended that the scope of the invention be limited except by the claims.

What we claim is:

1. In a method of manufacturing cement bonded boards, including the steps of (a) mixing chip material, cement, additives, and water in predetermined proportions;

(b) forming the mixture into a mat;

(c) sectioning the mat into board blanks;

(d) pressing, hardening, and seasoning the blanks;

(e) conditioning the blanks to achieve moisture acclimitization; and (f) edge preparation and final finishing of the blanks; the improvement comprising:

trimming the blanks to the desired nominal size during the edge preparation step, thereby protecting the board edges up until the edge preparation step and also producing waste material; and comminuting and adding at least some of the waste material to the chip material prior to a subsequent mat forming step, thereby making economical use of the waste material.

2. A method as in claim 1 wherein said waste material is added to the chip material prior to the mixing step.

3. A method as in claim 2 wherein said waste material is comminuted with said chip material prior to the mixing step.

4. A method as in claim 2 wherein said waste material is temporarily stored in a bunker prior to being added to the chip material.

5. A method as in claim 2 wherein the waste material added is regarded as substituting for approximately the same quantity of chip material when calculating said proportions.

6. A method as in claim 2 wherein said chip material is separated into coarse grade intermediate layer chip material and fine grade covering layer chip material, and fine grade comminuted waste material is added to the covering layer chip material prior to the mixing step.

7. A method as in claim 6 wherein coarse grade comminuted waste material is added to the intermediate layer chip material prior to the mixing step.

8. A method as in claim 7 wherein coarse graded comminuted waste material is comminuted again before being added to the intermediate chip material.

9. A method as in claim 7 wherein the fine grade and coarse grade comminuted waste material are regarded as substituting for approximately the same quantity of chip material in the respective layers to which the waste material is added.

10. A method as in claim 6 wherein coarse grade comminuted waste material is comminuted again and added to the covering layer chip material prior to the mixing step.

11. A method as in claim 6 wherein said final finishing step produces grinding dust and said dust is added to the covering layer chip material prior to the mixing step.

* * * * *